US011165213B2

(12) United States Patent
Staver (10) Patent No.: US 11,165,213 B2
(45) Date of Patent: Nov. 2, 2021

(54) ULTRA-FAST AND STABLE METHOD TO CHANGE THE DIVERGENCE OF A LASER BEAM

(71) Applicant: BAE SYSTEMS Information and Electronic Systems Integration Inc., Nashua, NH (US)

(72) Inventor: Philip R. Staver, Wilton, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 259 days.

(21) Appl. No.: 16/448,878

(22) Filed: Jun. 21, 2019

(65) Prior Publication Data

US 2020/0403368 A1    Dec. 24, 2020

(51) Int. Cl.
*H01S 3/00*    (2006.01)
*G02B 27/10*   (2006.01)
*G02B 27/09*   (2006.01)

(52) U.S. Cl.
CPC ........ *H01S 3/0071* (2013.01); *G02B 27/0927* (2013.01); *G02B 27/10* (2013.01)

(58) Field of Classification Search
CPC .... G02B 27/10; G02B 27/0927; G02B 21/08; G02B 15/177; G02B 15/1445; G02B 26/007; G02B 7/16; H01S 3/0071; H04N 5/2254

See application file for complete search history.

(56) References Cited

U.S. PATENT DOCUMENTS

| 10,775,149 B1* | 9/2020 | Antonelli | ........... G01B 11/0641 |
| 2003/0206352 A1* | 11/2003 | Mihara | ................ G02B 15/177 |
| | | | 359/684 |

\* cited by examiner

*Primary Examiner* — Mustak Choudhury
(74) *Attorney, Agent, or Firm* — Maine Cernota & Rardin; Scott J. Asmus (57) ABSTRACT

An optical system including a first lens element having an optical center, a second lens element having an optical center spaced apart from the first lens element and oriented such that a beam passing through the optical center of said first lens element will also pass straight the optical center of the second lens element, the beam defining an optical path; and at least one planar, optical slab configured to be movable between at least two positions, a first position wherein at least a portion of a planar surface of the optical slab is disposed between the first and second lens elements such that a beam transmitted therethrough also passes through the planar, optical slab and a second position wherein the planar, optical slab is fully outside of the optical path created by the first and second lens elements.

19 Claims, 9 Drawing Sheets

ULTRA-FAST AND STABLE METHOD TO CHANGE THE DIVERGENCE OF A LASER BEAM

STATEMENT OF GOVERNMENT INTEREST

This invention was made with government support under Contract No. 14-C-8215. The United States Government has certain rights in the inventions.

FIELD OF THE DISCLOSURE

The following disclosure relates generally to optical systems and, more specifically, to optical systems configured to alter the divergence of a laser beam.

BACKGROUND

Due to an explosion in both civilian and military wireless communication, there is a growing need for high speed, reliable, secure, wireless communication of large amounts of data between communicating nodes. It should be noted that the term "wireless" is used throughout this disclosure to refer to any communication that does not depend on a physical link between sender and receiver. Hence, the term "wireless", as used herein, excludes fiber optic communication as well as communication over copper wires.

Traditional communication by wireless radio frequencies suffers from several shortcomings, many of which arise from the wide geographic dispersion of typical radio emissions (e.g. side lobes). Even when directional antennae and antenna arrays are used, radio signals are generally disbursed over large geographic areas, causing rapid attenuation of the signal strengths with distance, and also causing the signals to be relatively easy to intercept by unintended receivers. Due to the geographic overlap of radio communication signals, it is typically necessary to assign radio transmissions to specific frequency bands, which are often in limited supply. Furthermore, it is relatively easy for hostile antagonists to attempt to jam radio communications by transmitting radio signals at high energies that blanket a region of interest.

There are several approaches that attempt to address these problems of wireless radio communications. For example, bandwidth restrictions can be mitigated by opportunistically seeking and using bands that are nominally assigned to other uses, but are not currently in use. Various time and coding schemes can be employed to allow more than one communication link to share the same frequency band. So-called "multi-user" detection can also be employed to further distinguish signals transmitted on overlapping frequencies. The geographic range of wireless signals may also be extended by implementing signal relay nodes within a region of interest.

Security of wireless radio communications can be improved, for example, by employing secure transmission methods such as frequency "hopping," by adding pseudo-noise to communications, and by encoding communications with sophisticated, virtually impregnable cyphers. The Link 16 protocol is an example of this approach.

Nevertheless, all of these approaches to radio communication include significant disadvantages, such as increased cost and complexity, and message processing overhead that can slow communication and limit data transfer speeds.

Given these limitations, laser communication, or "laser-com," offers an attractive wireless alternative to radio communication, especially when point-to-point communication is required. Notably, the non-dispersed, focused character of laser communication intrinsically avoids most of the problems that are associated with radio communication. In particular, there is no need to assign frequency bands to laser-com users, because interference between laser signal beams is avoided so long as two beams are not directed to the same recipient. Laser signals experience very little attenuation as a function of distance, because the signal energy remains tightly focused in a beam. Communication security is also intrinsically high, as the interception of and interference with laser communications requires direct interception of a laser communication beam and/or focusing jamming beams directly at an intended signal receiver.

One important application that can benefit significantly from laser-com is satellite communications, where line-of-sight access is generally available, and where the communication distances are very great. Laser-com can provide communication data rates for satellites that are much higher than radio data rates, with unmatched anti jam characteristics and an inherently low risk of communications intercept. Laser-com also eliminates the need for frequency planning and authorization, and circumvents the highly congested RF spectrum bandwidth constraints that limit the practical data rates available to users of RF links.

Figure 1:
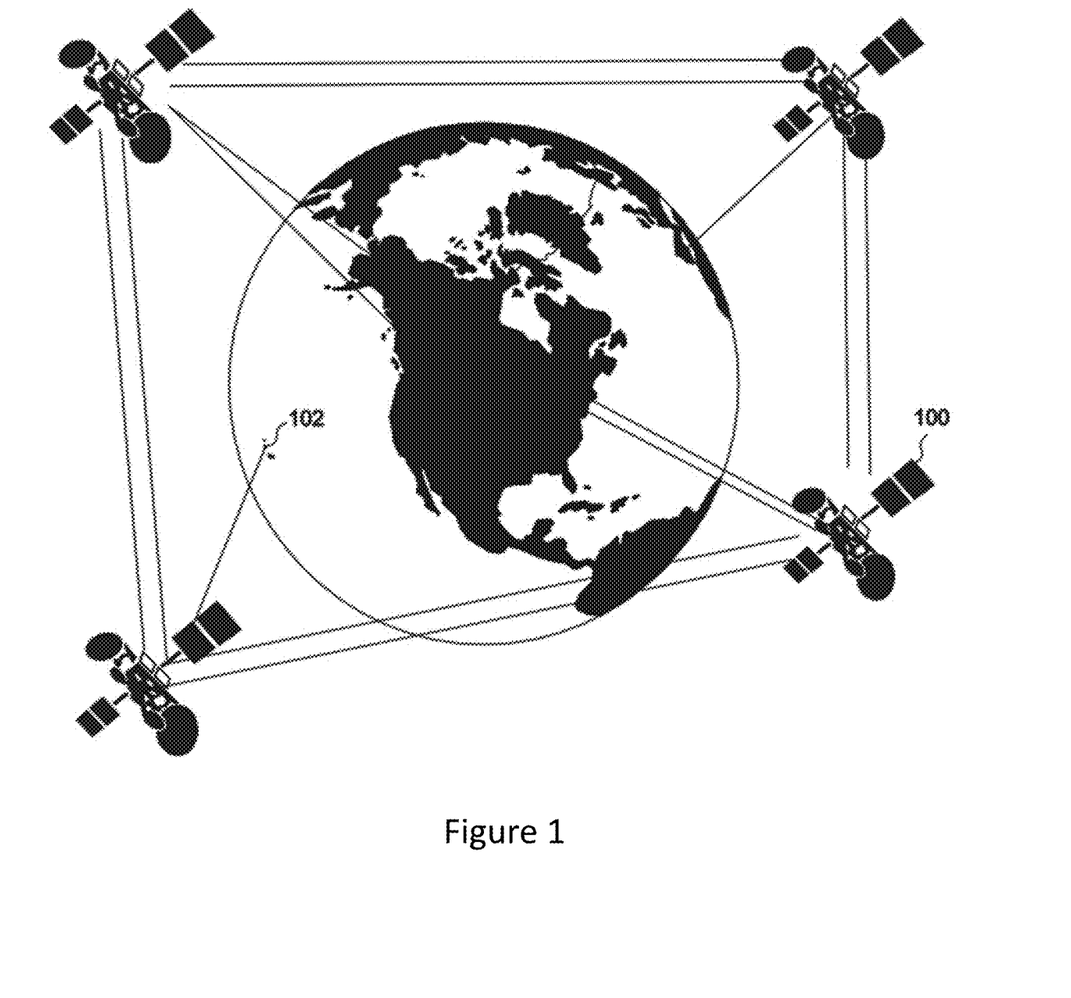
FIG. 1 illustrates laser-corn between orbiting satellites, and between the satellites and ground-based nodes, in accordance with embodiments of the present disclosure.

With reference to FIG. 1, laser communications holds great promise for multi-Gbps (Giga-bits per second) connections between space platforms 100, as well as between ground-based nodes 102 and space platforms 100, owing to the availability of efficient, multi-watt laser sources and exceedingly high antenna gain, having beam widths of only 10-20 micro-radians and telescope apertures that are only four to eight inches in diameter. Even when much lower data rates of tens to hundreds of mega-bits per second (Mbps) are of interest, laser-com may be desirable due to its inherent Low Probability of Intercept (LPI), Low Probability of Detection (LPD), and anti jam characteristics.

It should be noted that the disclosure herein is mainly presented with reference to satellite communication. However, it will be understood by those of skill in the art that the present disclosure is not limited to satellite communication, but also applies to other implementations of laser communications.

Of course, there are certain problems associated with laser communication that arise specifically from the focused nature of laser beams. In particular, it is necessary for communicating nodes to identify each other and align their lasers so as to effectively communicate. In the case of satellite laser-com, these identification and alignment problems are especially acute, because laser sources that are well separated by terrestrial standards, for example several miles apart from each other, may nevertheless appear to be almost geographically overlapping from the viewpoint of a satellite. Furthermore, thermal and other atmospheric effects can lead to both frequency (wave length) and angular (apparent location) shifting of an incident laser communication beam, even after it is identified and aligned. The angular vibrational effects, together with other short-term mechanical instabilities of the satellite or other receiving node, are referred to herein collectively as "jitter."

Figure 2:
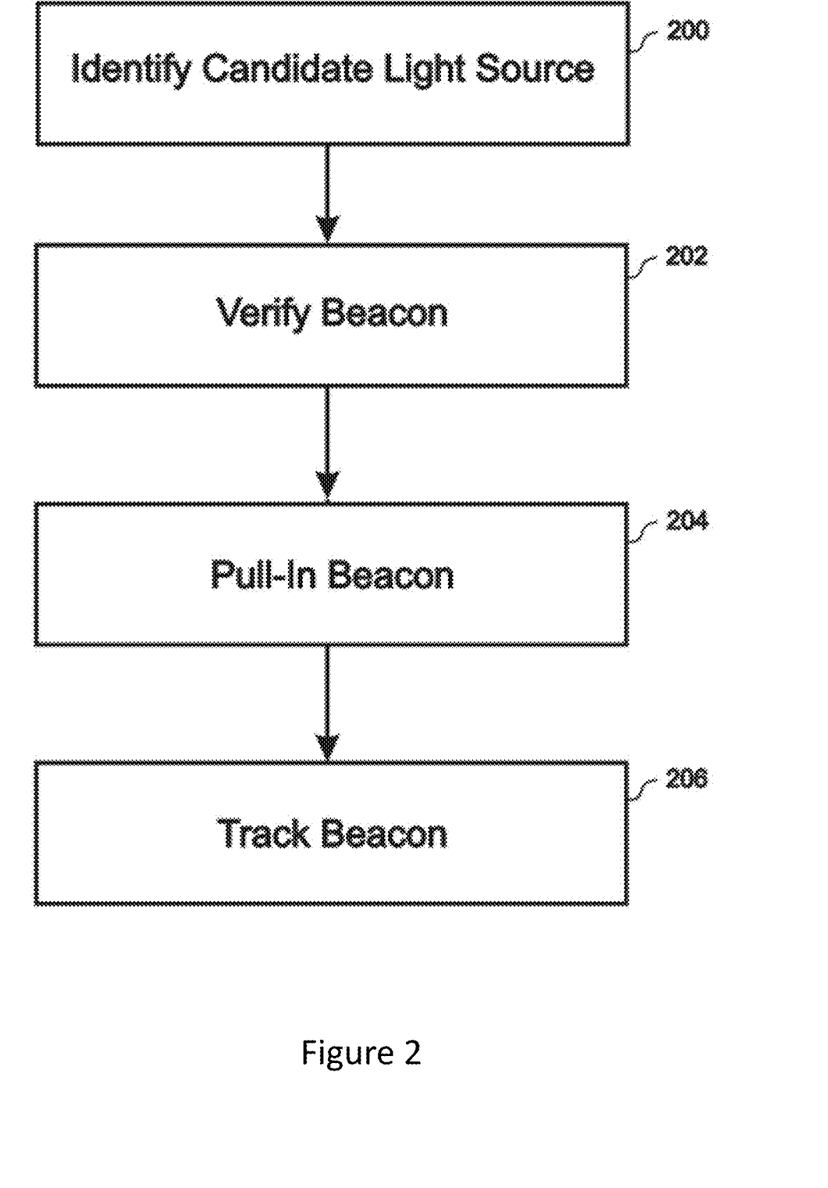
FIG. 2 is a flow diagram illustrating steps required for aligning a laser-corn receiving system with a transmitting node, in accordance with embodiments of the present disclosure.

With reference to FIG. 2, there are at least four steps to establish and maintain laser communications. First, a candidate light source, referred to herein as a "hot spot," is identified from within a scene of interest 200. Second, the hot spot is verified as being a communication signal and its transmission source is identified so as to determine if it is a signal of interest 202. Third, the optics of the laser-com receiving system is aligned with the incoming beam 204.

Finally, once communication has been established, the beam is tracked during communication so that the alignment is maintained and the communication is not interrupted 206.

The intensity of a light source is determined by Equation 1, shown below:

$$I_{peak} = \frac{8}{\pi} * \frac{P_{Total}}{\theta_{Full-Angle}^2} * \frac{1}{Z_{Range}^2} * T_{(Z_{Range})}$$

Where: $P_{Total}$ is the total power in the transmitted laser beam;

$\theta_{Full-Angle}$ is the full-angle divergence (in radians) of the laser beam;

$Z_{Range}$ is the range to the target; and

T is the atmospheric transmission of the laser beam between the laser transmitter and target.

Typically, as the range between communicating nodes changes, the illumination intensity as computed by Equation (1) will also change due to the divergence of the transmitted beam. Frequently, it may be desirable to maintain a constant illumination intensity during changes in range between communicating nodes. In other cases, however, it is desirable to change the intensity of a light source where the range between communicating nodes is not changing.

Furthermore, even in cases not involving laser communications, a laser beam may be used to illuminate a distant target. The purpose of this laser transmitter may be to provide an illumination system for a receiver system that resides on the same platform as the laser transmitter or on a different platform or for another purpose altogether. This target can be at distances that can range from near (<100 meters), or far (>10 km). If this target is a moving target, the distance to the target may be variable over time. In such cases, it may also be desirable to effectively and rapidly change the intensity of the light source.

Changing the intensity of a light source can be accomplished by changing the divergence of the transmitted laser beam, as quantified by the parameter $\theta_{Full-Angle}$ in Equation (1). To increase the on-target intensity, $\theta_{Full-Angle}$ is reduced. To decrease the on-target intensity, $\theta_{Full-Angle}$ is increased.

If the range between nodes is significant (many kilometers), it is often desirable, and, in some cases, required, to change the divergence of the transmitted laser beam in a very precise and stable way so that the pointing (boresight) of the laser beam is preserved to a great degree of precision. It also may be desirable, or even required, to change the divergence rapidly, such that the transition from one divergence state to another occurs over a very short period of time.

What is needed, therefore are methods and apparatuses that facilitate changing the divergence of a laser beam with a great deal of pointing precision and at a high rate of speed, preferably where the divergence of the transmitted beam is independent of temperature (or athermal), which is highly desirable for certain applications in which the temperature of the laser transmitter system may vary due to environmental and other factors.

SUMMARY

The present disclosure provides a method and apparatus that facilitates changing the divergence of a laser beam with a great deal of pointing precision and at a high rate of speed.

In embodiments, the divergence of the transmitted beam is independent of temperature (i.e. athermal).

Implementations of the techniques discussed above may include a method or process, a system or apparatus, a kit, or a computer software stored on a computer-accessible medium. The details or one or more implementations are set forth in the accompanying drawings and the description below. Other features will be apparent from the description and drawings, and form the claims.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

Figure 3:
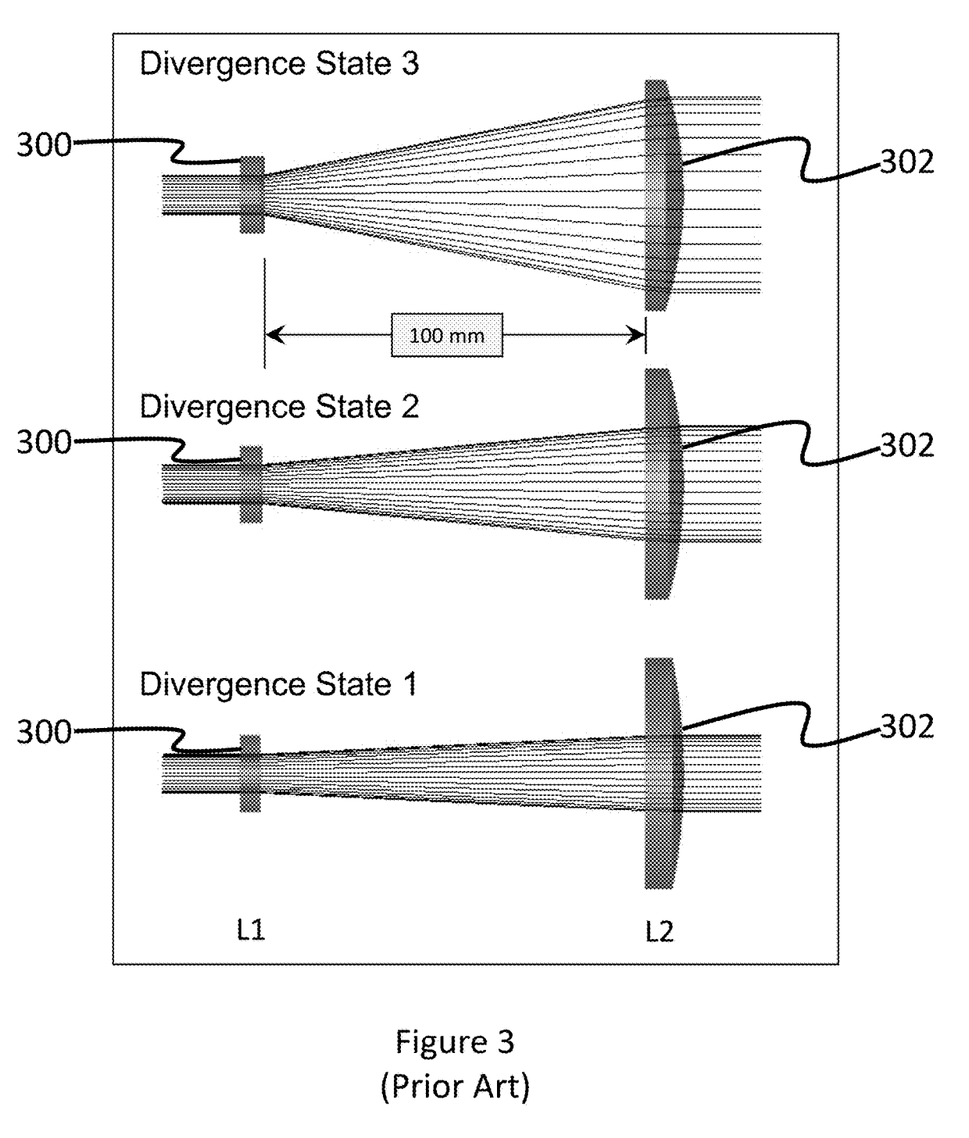
FIG. 3 is a schematic showing a prior art system used to alter the divergence of a laser beam.

A conventional method of how the divergence of a laser beam is changed is depicted in FIG. 3. In this example, the telescope depicted in FIG. 3 collimates a laser beam, having a diameter of $D_0$ at the exit of the telescope. In this configuration, the divergence of the transmitted laser beam can be computed from Equation (2), shown below:

$$\theta_{Full-Angle} = \frac{4}{\pi} * \frac{M^2 \lambda}{D_0}$$

Where: $M^2$ is the beam quality of the transmitted laser beam; and

λ is the wavelength of the transmitted laser beam.

Using the configuration depicted in FIG. 3, the divergence of the transmitted laser beam may be varied by using either or both of the following conventional methods. The first method (hereinafter, Method 1) involves changing the magnification of the telescope, which can be done by changing the lenses L1/L2 (300/302) of the telescope. The second method (hereinafter, Method 2) involves changing the spacing between the lenses L1/L2 (300/302). If Method 2 is used, the beam that exits the telescope will not, initially, be collimated, while Method 1 provides this initial collimation.

For applications that require a high degree of pointing precision (i.e. small boresight errors) and also require that the divergence state be changeable with a high degree of speed, the following problems occur and are circumvented by the teachings of the present disclosure, as will be explained herein.

These problems can be categorized as being two distinct types, which will herein be referred to as "Type 1" and "Type 2" problems. More specifically, Type 1 problems are associated with pointing precision while Type 2 problems are associated with the maximum speed with which the divergence state can be changed.

Even more specifically, where Method 1 is used to change the divergence state, when either lens is substituted for one of a different magnification level, as must be done to change the divergence state of the beam, the alignment of the optical axis of the replacement lens must exactly match the optical axis of the previous lens to a great deal of precision to ensure pointing precision is maintained. If alignment is imperfect upon lens substitution, the pointing direction of the new beam divergence will be offset in direction from the previous divergence configuration.

Where Method 2 is used, the axis of translation of the two lenses must be perfectly aligned with the optical axes of the two lenses, otherwise the boresight direction of the transmit beam will change as the divergence state is changed.

Figure 4A:
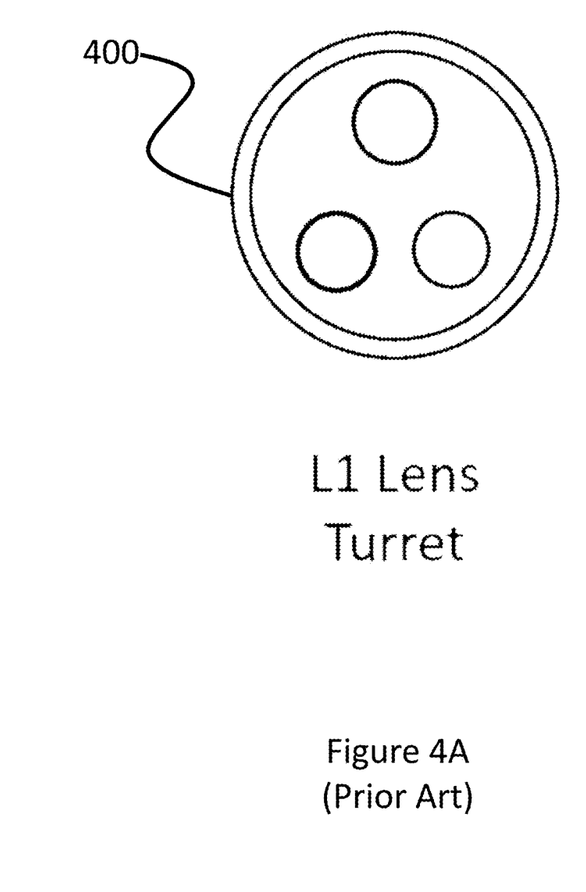
FIG. 4A is a schematic showing a component of the prior art system of FIG. 3.
Figure 4B:
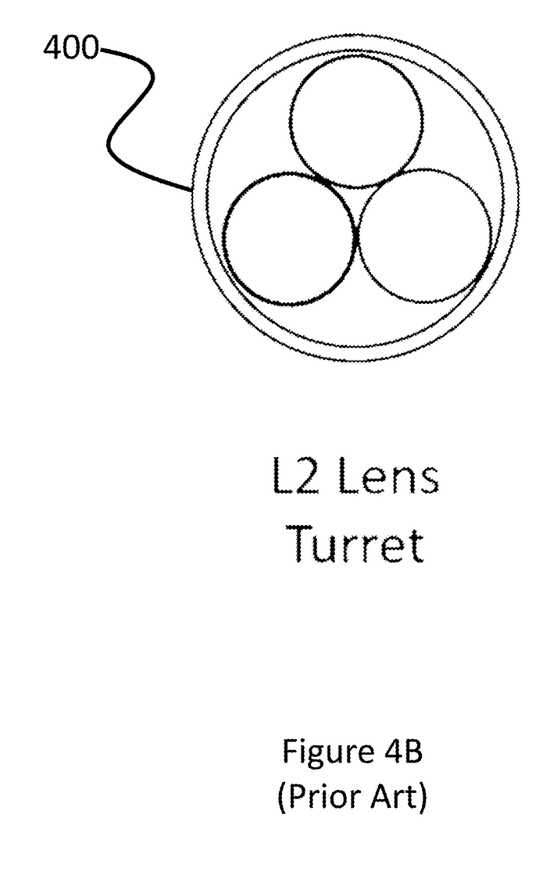
FIG. 4B is a schematic showing a component of the prior art system of FIG. 3.

Now regarding Type 2 problems, where Method 1 is used to alter the divergence of the beam, when either lens is removed and replaced, the new lens for the new divergence state must be perfectly centered with respect to the previous lens to avoid Type 1 problems. One way that this could be done would be to put the lenses on turrets 400, such as those depicted in FIGS. 4A and 4B, and spin the 400 turrets containing the lenses into the beam. When the turret is spun, one lens is removed and another lens is inserted. If this method is used, the time required to switch between divergence states is equal to the time needed to rotate one lens out and rotate the next one completely into position. Furthermore, the moving lens (on the rotating turret 400) must completely come to rest and be mechanically stable before the desired divergence state is stably achieved.

Figure 5:
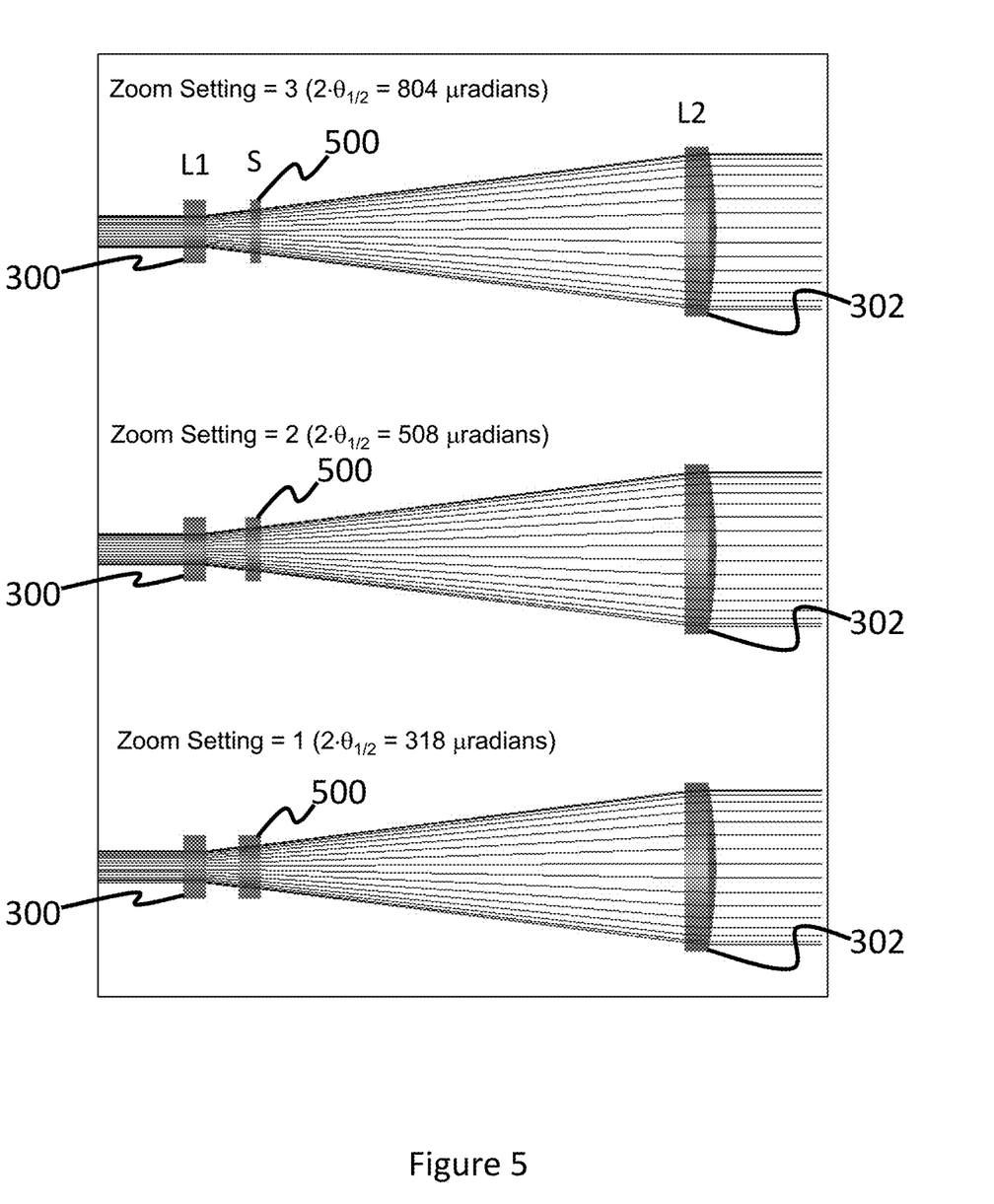
FIG. 5 is a schematic showing a configuration of lenses used to alter the divergence of a laser beam, in accordance with embodiments of the present disclosure.
Figure 6:
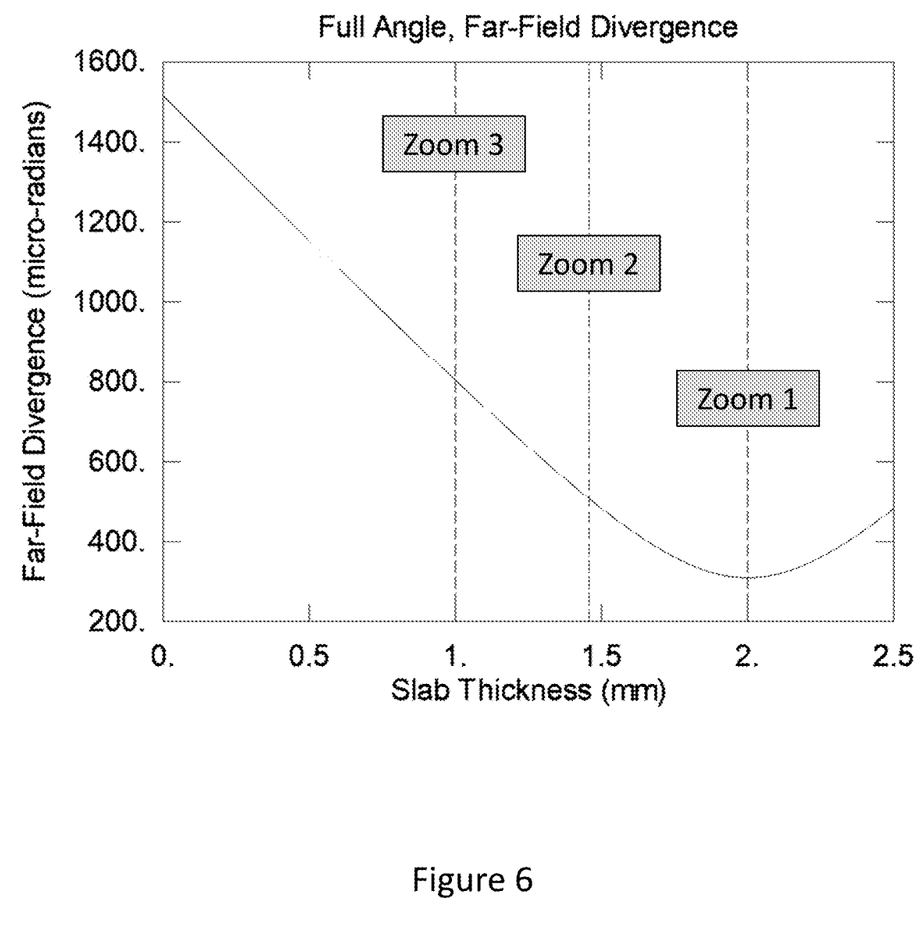
FIG. 6 is a chart comparing the divergence of a laser beam to slab thickness for the configuration shown in FIG. 5, in accordance with embodiments of the present disclosure.

The teachings of the present disclosure mitigate both Type 1 and Type 2 problems by changing the divergence state of the transmitted beam by inserting planar, optical slabs of glass 500 of different thicknesses in between two fixed, powered, optical lenses L1/L2 (300/302), as depicted in FIG. 5 and described in FIG. 6, with each slab 500 providing a fixed divergence. This configuration varies the effective spacing between the two lenses L1/L2 (300/302) of the telescope by changing the optical path length without changing the physical path length between the two lenses L1/L2 (300/302). In this example, three discreet slab 500 thicknesses are shown. Each slab 500 thickness achieves a different divergence state of the transmitted laser beam.

Notably, this arrangement circumvents the Type 1 problems (errors in pointing precision) because, when a planar slab of glass 500 is inserted into a beam, the glass slab 500 does not need to be well centered for the boresight direction of the transmitted beam to be accurately preserved. In fact, the boresight direction of the transmitted beam does not depend on the centering of the glass slab 500 at all.

Note that the elements in an afocal telescope (such as that depicted in FIG. 5 and described by FIG. 6) that are responsible for errors in the pointing precision and stability are the position stabilities of powered elements, L1/L2 (300/302). In the present disclosure, powered optical components remain fixed and unchanged, limiting the potential for misalignment and inaccuracies that arise as a result thereof. The only moving components of the basic system are the planar slabs of glass 500 that are placed between a first lens (L1/300) and a second lens (L2/302). Since pointing precision does not depend on the centration of these elements, the pointing stability of the present disclosure is inherently significantly more stable than the prior art.

Such a configuration also circumvents the Type 2 problems (speed) discussed above, since a planar slab of glass 500 has no optical center, which can be defined as a point on the axis of a lens that is so located that any ray of light passing through it in passing through the lens suffers no net deviation and that may be within, without, or on either surface of the lens. Due to this characteristic, as soon as the planar slab 500 has moved across the laser beam, the desired divergence state is stably achieved. In contrast to the prior art discussed above, the planar glass slab 500 does not have to be stationary, or stopped, for a stable pointing condition and divergence state to be achieved.

In embodiments, the planar slabs of glass 500 that are placed between the first lens (L1/300) and the second lens (L2/302) are positioned ~45.3 mm from first lens (L1/300), as is depicted in the referenced Figures and assumed in the corresponding graphs, although other spacing values could be used. In other embodiments, spacing is between 35-55 mm. Alternative spacing values could be used to shift the curve shown in FIG. 6 to the left or right or to meet design constraints without departing from the teachings of the present disclosure, as would be understood by one of ordinary skill in the art.

In embodiments, a plurality of planar glass slabs 500 of different thickness are placed on a spinning turret 400 and configured such that each may be rapidly placed in the optical axis between powered optical components L1/L2 (300/302), which are fixed in position. In embodiments, rotation of the turrets 400 is accomplished via a motor coupled to the turret(s) 500, such as by a belt or other means, as would be known to one of ordinary skill in the art.

By rotating the planar glass slabs 500 of different thickness into the beam, different divergence states are achieved rapidly and without the introduction of Type 1 problems while mitigating Type 2 problems by allowing the divergence state to become stable prior to movement of the turrets ceasing.

In embodiments, the turrets 400 move continuously, allowing for rapid cycling between stable divergence states.

In embodiments, three slabs 500 are used, wherein the slab 500 thicknesses are 2.094 mm, 1.458 mm, and 1.000 mm.

Furthermore, in certain circumstances, a telescope constructed in accordance with the teachings of the present disclosure may be subject to highly variable environmental conditions, such as large variations in ambient temperature that could result in a degradation of pointing precision.

Figure 7:
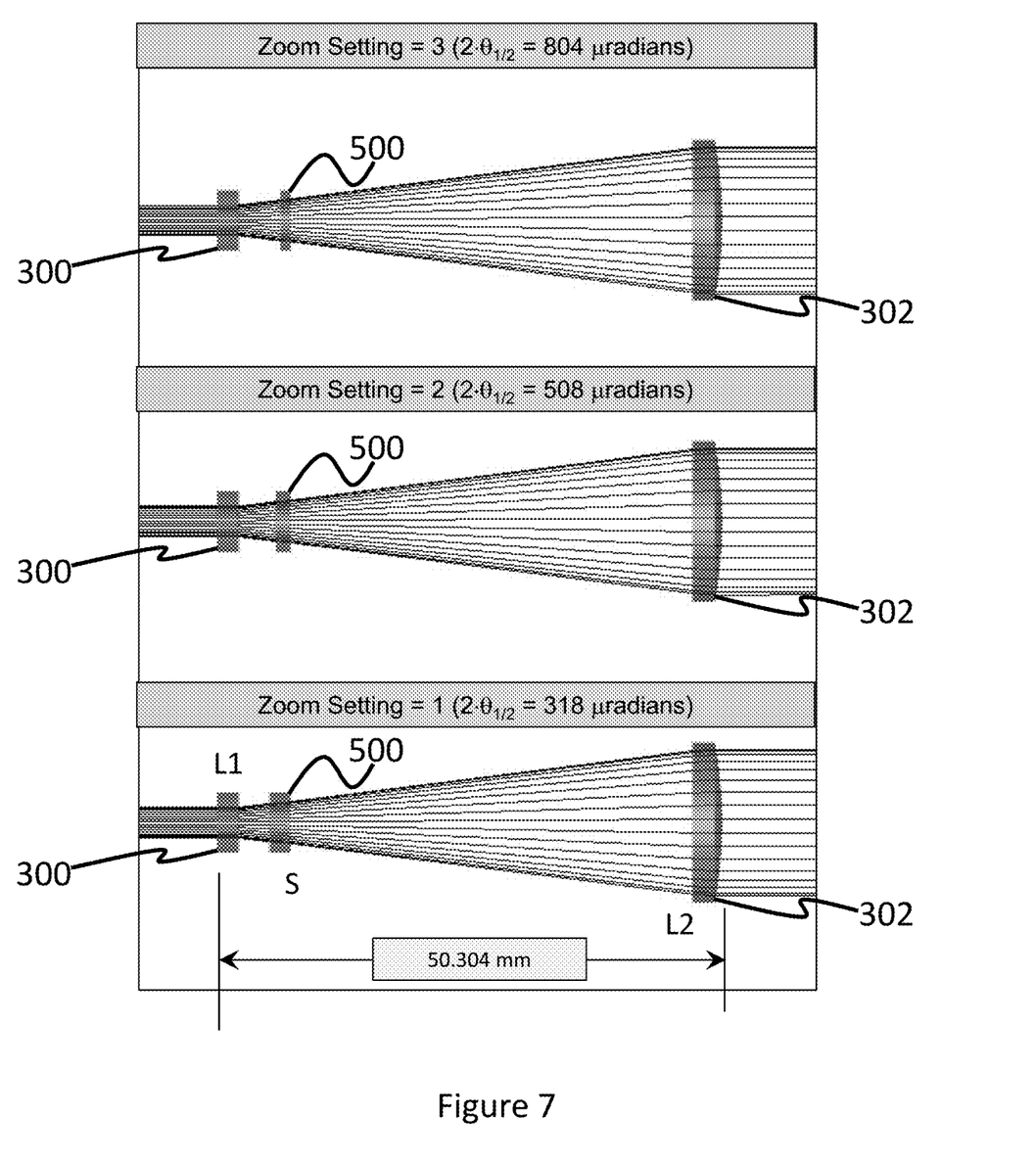
FIG. 7 is a schematic showing an athermal configuration of lenses used to alter the divergence of a laser beam, in accordance with embodiments of the present disclosure.
Figure 8:
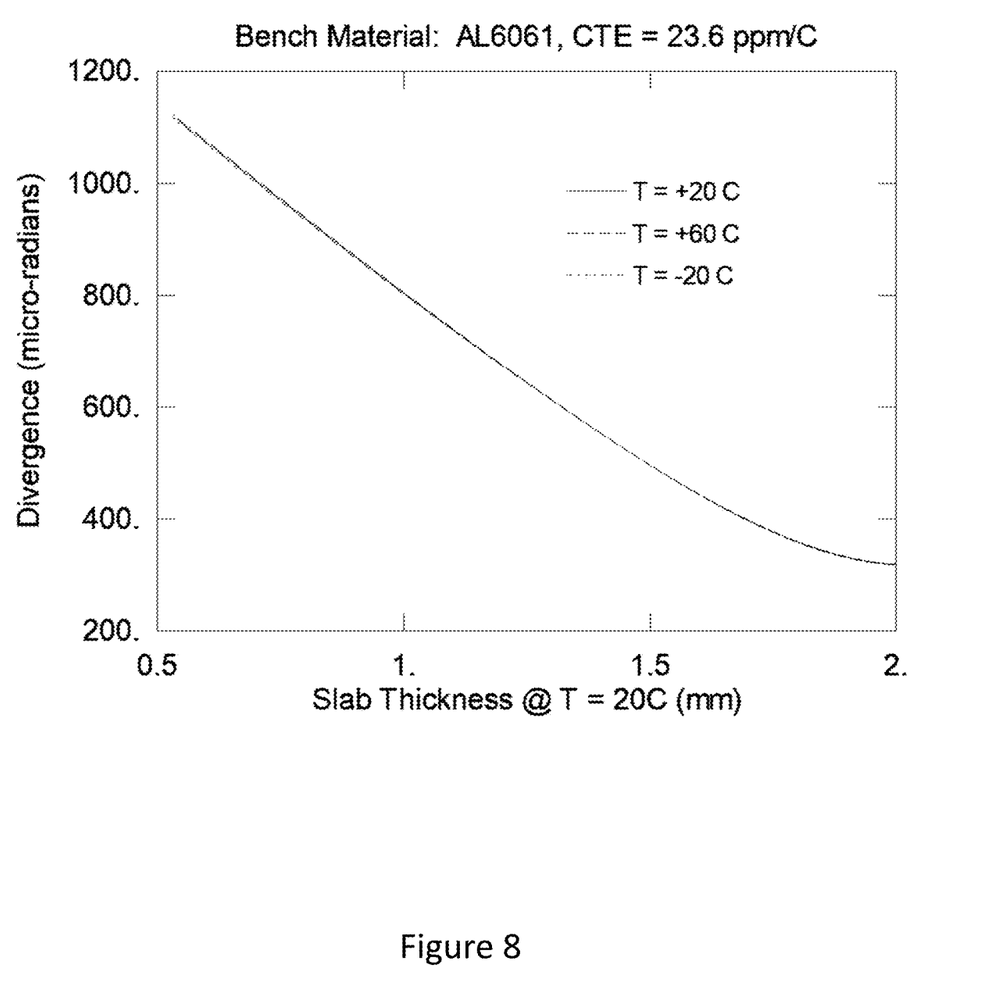
FIG. 8 is a chart comparing the divergence of a laser beam to slab thickness for the configuration shown in FIG. 7 at three different temperatures, in accordance with embodiments of the present disclosure.

Therefore, embodiments, such as that shown in FIG. 7 and described in FIG. 8, provide a telescope whose divergence state is relatively invariable when exposed to expected temperature changes (i.e. an athermal telescope).

More specifically, normally, unless special considerations during the design of this telescope are made, the divergence of the output beam will change as the temperature changes. This is due to at least the following factors: thermal expansion of the housing material; thermal expansion of the lens materials; and changes in the refractive index of the lens material(s). If, however, the glass materials and the metal housing material are chosen as described herein, a design in which the thermo-optical effects of the lens materials compensate for the thermo-mechanical effects of the housing (i.e. an athermal configuration) is achieved.

A depiction of this aspect of the present disclosure is shown in FIG. 7 and described in FIG. 8. More specifically, FIG. 8 graphically compares divergence to slab 500 thickness for three different temperatures, ranging from −20 to +60 C. Each curve overlaps perfectly with the others, indicating that the divergence of a beam transmitted therethrough is the same for these three temperatures.

In the embodiment shown and described in FIGS. 7 and 8, respectively, the divergence is athermalized for a housing material made of Aluminum alloy 6061. This is an alloy of Aluminum that is suitable for use in high-performance optical systems. For this telescope to be athermalized with this housing material, lens L1/300 is comprised of ZnSe, lens L2/302 is comprised of Schott glass SF14, and the slab(s) 500 are comprised of Infrasil® (a type of optical quartz). In other embodiments, the slabs 500 are instead constructed of UV fused silica.

In embodiments, lens L1/300 is plano-concave.

In embodiments, lens L2/302 is plano-asphere.

In embodiments, the housing has a Coefficient of Thermal Expansion (CTE) of 23.6 ppm/C.

In embodiments, three slabs 500 are used, wherein the slab 500 thicknesses are 2.094 mm, 1.458 mm, and 1.000 mm.

Figure 9:
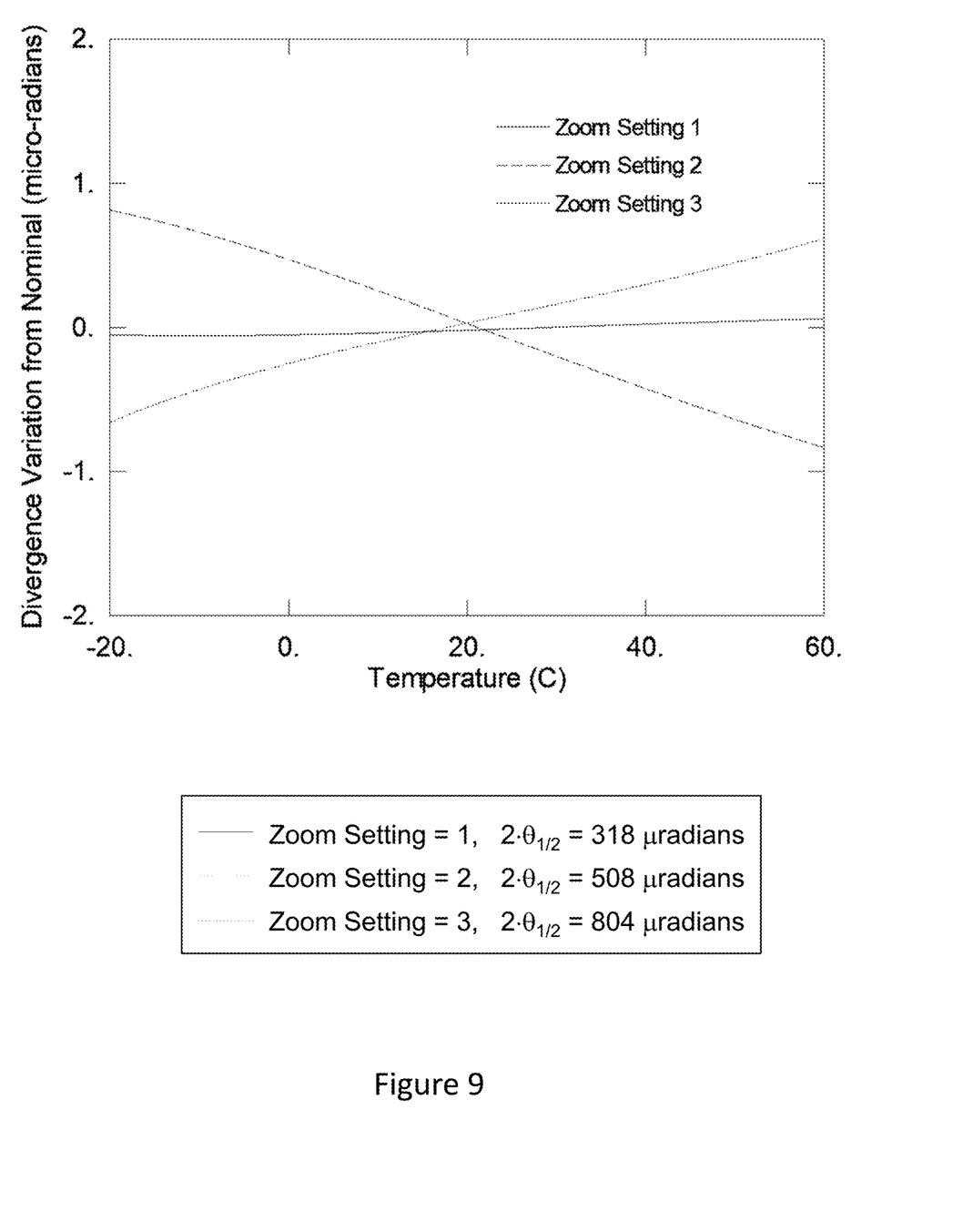
FIG. 9 is a chart comparing divergence error to temperature for the athermal system shown in FIG. 7 and described in FIG. 8.

The athermal characteristic of such a system, as shown in FIG. 7 and described in FIG. 8, are provided for the specific slab 500 thicknesses discussed above in FIG. 9, which shows that there is less than +/−0.2 micro-radians of variation over the temperature range shown (−20 to 60 degrees C.).

This is not the only athermalized solution for this telescope configuration. As would be apparent to one of ordinary skill in the art, other optical glasses that work together with an AL6061 housing to provide an athermalized system are possible. Furthermore, other athermalized configurations utilizing different housing materials are also possible without departing from the teachings described herein.

This solution allows the changing of divergence states with significantly better mechanical precision and bore sight stability, relative to the prior art. It also allows the changing of divergence states much more rapidly than existing systems and techniques. The proposed solution is also, in embodiments, athermal, allowing for consistent operation over a large temperature range.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

What is claimed is:

1. An optical system, comprising:
    a first lens element having an optical center;
    a second lens element having an optical center spaced apart from the first lens element and oriented such that a beam passing through the optical center of said first lens element will also pass through the optical center of the second lens element, the beam defining an optical path; and
    at least one planar, optical slab configured to be movable between at least two positions, a first position wherein at least a portion of a planar surface of the optical slab is disposed between the first and second lens elements such that a beam transmitted therethrough also passes through the planar, optical slab and a second position wherein the planar, optical slab is fully outside of the optical path created by the first and second lens elements;
    wherein the first lens element, second lens element, and at least one planar, optical slab are all enclosed within a housing.

2. The system of claim 1, wherein the housing is made of Aluminum alloy 6061.

3. The system of claim 2, wherein the first lens element is made of ZnSe.

4. The system of claim 3, wherein the second lens element is made of glass N-SF14.

5. The system of claim 4, wherein the planar, optical slabs are made of infrared grade fused quartz.

6. The system of claim 4, wherein the planar, optical slabs are made of UV fused silica.

7. The system of claim 1, wherein the first lens element is plano-concave.

8. The system of claim 7, wherein the second lens element is plano-asphere.

9. The system of claim 1, wherein the system comprises three planar, optical slabs.

10. The system of claim 9, wherein the three planar, optical slabs are 0.094 mm, 1.458 mm, and 1.000 mm thick.

11. The system of claim 1, further comprising a rotatable turret in which the at least one planar, optical slab is fixed.

12. The system of claim 11, wherein the rotatable turret comprises three planar, optical slabs.

13. The system of claim 12, wherein the three planar, optical slabs are 0.094 mm, 1.458 mm, and 1.000 mm thick.

14. The system of claim 1, wherein the system is athermal between −20 C and 60 C.

15. The system of claim 1, wherein the at least one planar, optical slab is oriented perpendicularly to the optical path.

16. An optical system, comprising:
    a housing comprising:
    a first lens element having an optical center;
    a second lens element having an optical center spaced apart from the first lens element by 35-55 mm and oriented such that a beam passing through the optical center of said first lens element will also pass through the optical center of the second lens element, the beam defining an optical path; and at least one planar, optical slab configured to be movable between at least two positions, a first position wherein at least a portion of a planar surface of the optical slab is disposed between the first and second lens elements such that a beam transmitted therethrough also passes through the planar, optical slab and a second position wherein the planar, optical slab is fully outside of the optical path created by the first and second lens elements.

17. An optical system, comprising:

a housing comprising:

a first lens element having an optical center;

a second lens element having an optical center spaced apart from the first lens element and oriented such that a beam passing through the optical center of said first lens element will also pass through the optical center of the second lens element, the beam defining an optical path; and a rotatable turret comprising a plurality of planar, optical slabs of different thicknesses, wherein the rotatable turret is configured to rotate each of the plurality of planar, optical slabs between at least two positions, a first position wherein at least a portion of a planar surface of the planar, optical slab is disposed between the first and second lens elements such that a beam transmitted therethrough also passes through the planar, optical slab and a second position wherein the planar, optical slab is fully outside of the optical path created by the first and second lens elements, wherein the optical system is athermal from −20 C to 60 C.

18. The system of claim 17, wherein the housing is made of Aluminum alloy 6061, the first lens element is made of ZnSe, the second lens element is made of Schott glass SF14, and the planar, optical slabs are made of Infrasil.

19. The system of claim 18, wherein the first lens element is plano-concave and the second lens element is plano-asphere.

* * * * *